(12) United States Patent
Morales

(10) Patent No.: US 7,434,492 B1
(45) Date of Patent: Oct. 14, 2008

(54) CLAMP MEMBER FOR COMPONENT ATTACHMENT TO A HANDLEBAR, AND LEVER ASSEMBLY INCLUDING SAME

(76) Inventor: Robert Morales, 16560 Harbor Blvd., Suite R, Fountain Valley, CA (US) 92708

( * ) Notice: Subject to any disclaimer, the term of this patent is extended or adjusted under 35 U.S.C. 154(b) by 367 days.

(21) Appl. No.: 10/919,728

(22) Filed: Aug. 17, 2004

(51) Int. Cl.
*B62K 21/12* (2006.01)
(52) U.S. Cl. .................................................. 74/551.8
(58) Field of Classification Search ............ 74/551.1, 74/551.8, 501.6, 502.2
See application file for complete search history.

(56) References Cited

U.S. PATENT DOCUMENTS

| | | | | |
|---|---|---|---|---|
| 2,874,587 A | * | 2/1959 | Schmid | 74/489 |
| 4,137,793 A | * | 2/1979 | Sowell | 74/488 |
| 4,232,565 A | * | 11/1980 | Leonheart | 74/489 |
| 4,256,197 A | * | 3/1981 | Kiser, Jr. | 180/335 |
| 4,391,160 A | * | 7/1983 | Myers | 74/551.8 |
| 5,481,934 A | * | 1/1996 | Tagawa | 74/473.14 |
| 6,176,640 B1 | * | 1/2001 | Gonczi | 403/375 |
| 6,892,603 B2 | * | 5/2005 | Barnett | 74/502.2 |

OTHER PUBLICATIONS

Works Connection Factory Hardware—Motorcross and ATV racing parts; Aug. 13, 2004; and http://www.worksconnection.com/store/new_newproducts.html.
Storm Cycles Tools; Aug. 13, 2004; and http://stormcycles.com/cgi-bin/web_store.cgi?page=hotstart.html&cart_id=28366.23407.

* cited by examiner

*Primary Examiner*—Richard W L Ridley
*Assistant Examiner*—Matthew Johnson
(74) *Attorney, Agent, or Firm*—Eric Karich

(57) ABSTRACT

A clamp member is described for attaching a component to a handlebar. The clamp member includes a substantially rigid body having a concave surface and a liner having a relatively low coefficient of friction. The liner has opposed first and second surfaces. The first surface is adapted for contacting the concave surface of the body, and the second surface is adapted for contacting an adjacent portion of an outer surface of the handlebar. A lever assembly is disclosed that includes the clamp member.

4 Claims, 1 Drawing Sheet

CLAMP MEMBER FOR COMPONENT ATTACHMENT TO A HANDLEBAR, AND LEVER ASSEMBLY INCLUDING SAME

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to vehicle component mounting systems, and more particularly to handlebar component mounting systems.

2. Description of Related Art

Vehicles such as bicycles and motorcycles have handlebars for steering. An operator of such a vehicle grasps opposite ends of the handlebar and turns the handlebar to steer the vehicle. Lever assemblies attached to the handlebars near the ends allow the operator to control certain systems of the vehicle, such as a brake or clutch systems, while the operator's hands remain cupped around the ends of the handlebars. By moving a lever of a lever assembly, the operator can advantageously control a corresponding system while simultaneously maintaining steering control of the vehicle.

Two-wheeled vehicles such as bicycles and motorcycles are not stable when moving very slowly or standing still, and tend to fall on their sides in such situations. Positioned in front of the ends of the handlebars, the levers of such vehicles are particularly vulnerable when this occurs, and are often subjected to forces sufficient to cause the levers to break. When a lever is broken, the operator is often unable to control of the corresponding system.

It would thus be advantageous to have an attachment mechanism for components such as lever assemblies that prevents the components from being broken despite being subjected to forces sufficient cause such breakage.

SUMMARY OF THE INVENTION

A clamp member is described for attaching a component to a handlebar. The clamp member includes a substantially rigid body having a concave surface and a liner having a relatively low coefficient of friction. The liner has opposed first and second surfaces. The first surface is adapted for contacting the concave surface of the body, and the second surface is adapted for contacting an adjacent portion of an outer surface of the handlebar. A lever assembly is disclosed that includes the clamp member.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
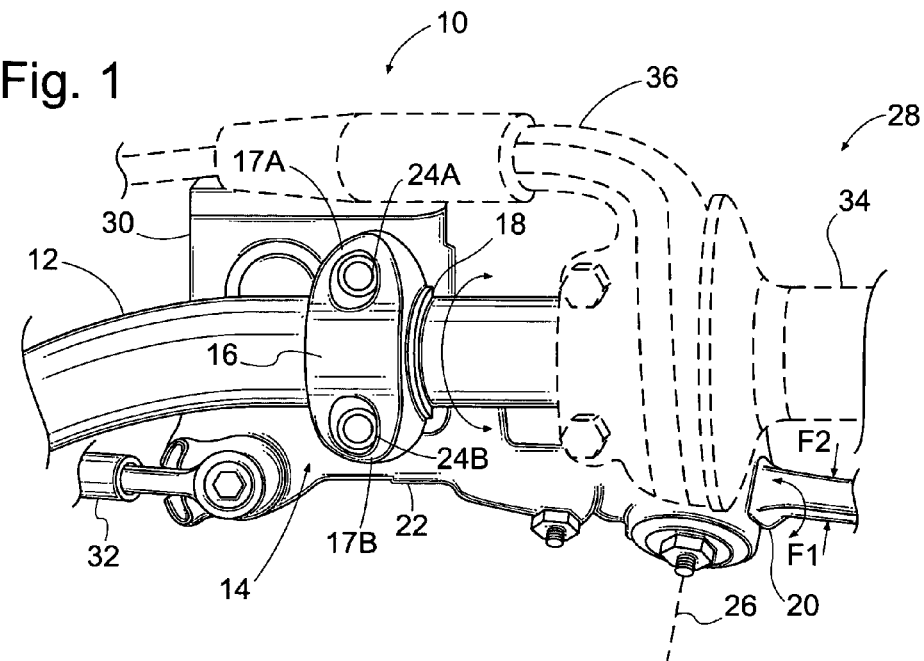
FIG. 1 is a perspective view of a lever assembly attached to a handlebar via a clamp member having a substantially rigid body and a low-friction liner in contact with an adjacent portion of an outer surface of the handlebar.

FIG. 1 is a perspective view of a lever assembly 10 attached to a handlebar 12 via a clamp member 14 having a substantially rigid body 16 and a low-friction liner 18 in contact with an adjacent portion of an outer surface of the handlebar 12. As described in detail below, when a force having a component not in a plane of motion of the lever 20 is applied to the lever 20, the low-friction liner 18 allows the lever assembly 10 to rotate about the handlebar 12 as indicated in FIG. 1, thereby advantageously preventing the lever 20 from being broken by the force.

The lever assembly 10 includes a lever 20 extending outwardly from and pivotally connected to a base 22. A pair of bolts 24A and 24B are passed through holes in opposite ends 17A and 17B of the body 16 of the clamp member 14 and are threaded into threaded holes in the base 22 to connect the lever assembly 10 to the handlebar 12. In general, the handlebar 12 forms a part of a vehicle such as a motorcycle or a bicycle, and the handlebar 12 is used to steer the vehicle.

The lever 20 pivots about an axis 26 and moves in a "plane of motion" including the lever 20 and an end 28 of the handlebar 12. In general, movement of the lever 20 by a human operator of the vehicle is used to control a system of the vehicle such as a brake system or a clutch system.

The clamp member 14 may advantageously replace a corresponding clamp member provided by a manufacturer of the vehicle that does not allows the lever assembly 10 to rotate about the handlebar 12 when a force having a component not in the plane of motion of the lever 20, and having sufficient magnitude to break the lever 20, is applied to the lever 20.

In the embodiment of FIG. 1, the base 22 of the lever assembly 10 includes a master cylinder 30, and movement of the lever 20 by the human operator causes the master cylinder 30 to produce fluid under pressure. The fluid under pressure is delivered to a disc brake system of the vehicle (e.g., a front disc brake system) via a fluid line 32.

In other embodiments of the lever assembly 10, the fluid under pressure produced by the master cylinder 30 is delivered to a clutch system of the vehicle via the fluid line 32. In yet other embodiments of the lever assembly 10, the base 22 includes a cable actuating mechanism in place of the brake master cylinder 30. The cable controls a system of the vehicle such as a brake system or a clutch system.

In general, the lever 20 is adapted to move only in the plane of motion. When a force having a component not in the plane of motion is applied to the lever 20, the low-friction liner 18 of the clamp member 14 allows the lever assembly 10 to rotate about the handlebar 12 as indicated in FIG. 1, thereby advantageously preventing the lever 20 from being broken by the force. It is noted that a magnitude of the force component is preferably greater than a selected threshold magnitude such that the lever assembly 10 is not rotated about the handlebar 12 by small forces (e.g., generated by the operator's hand during normal operation).

For example, in FIG. 1 forces F1 and F2 are substantially normal to the plane of motion of the lever 20. When the force F1, having sufficient magnitude, is applied to the lever 20, the low-friction liner 18 of the clamp member 14 allows the lever assembly 10 to rotate counterclockwise about the handlebar 12 (as viewed from the end 28), thereby preventing the lever 20 from being broken by the force F1. When the force F2, having sufficient magnitude, is applied to the lever 20, the low-friction liner 18 of the clamp member 14 allows the lever assembly 10 to rotate clockwise about the handlebar 12 (as viewed from the end 28), thereby preventing the lever 20 from being broken by the force F2.

In the embodiment of FIG. 1 a hand grip 34 is shown installed over the end 28 of the handlebar 12, and a throttle assembly 36 is shown installed at an end of the hand grip adjacent to the lever assembly 10. The lever 20 extends outward from the lever assembly 10 adjacent the hand grip 34.

It is noted that in FIG. 1 the end 28 of the handlebar 12 is a right end of the handlebar 12 from the operator's perspective. A lever assembly similar to the lever assembly 10 may be mounted on the left end of the handlebar 12. Further, the clamp member 14 of FIG. 1 may be advantageously used to attach other components to the handlebar 12, such as mirrors, etc.

Figure 2:
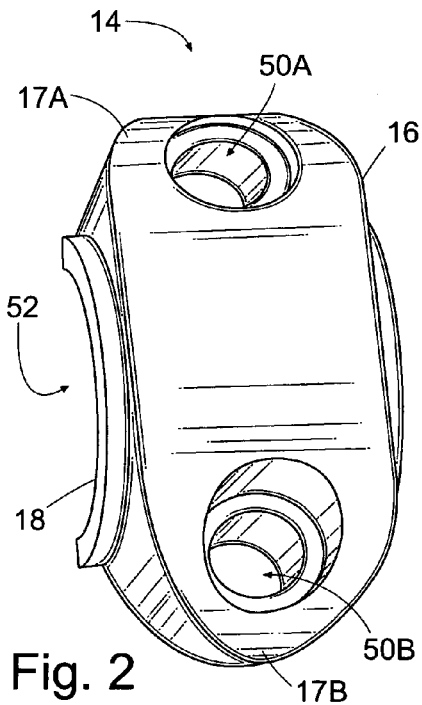
FIGS. 2 and 3 are perspective views of the clamp member of FIG. 1.
Figure 3:
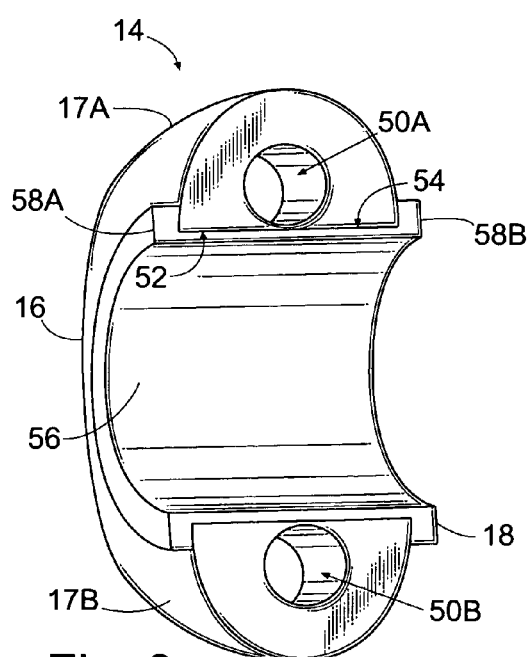

FIGS. 2 and 3 are perspective views of the clamp member 14 of FIG. 1. As illustrated in FIGS. 2 and 3, the body 16 of the clamp member 14 preferably has two holes 50A and 50B in the opposite ends 17A and 17B. Each of the holes 50A and 50B is adapted to receive a screw or bolt (e.g., a socket head screw or bolt) for connecting the clamp member 14 to the base 22 about the handlebar 12.

The body 16 has a concave surface 52, and the low-friction liner 18 is installed over the concave surface 52. In general, the liner 18 has a first surface 54 adapted for contacting the concave surface 52, and an opposed second surface 56 adapted for contacting the adjacent portion of the outer surface of the handlebar 12 (FIG. 1). The contact between the surface 54 and the concave surface 52, and between the surface 56 and the adjacent portion of the outer surface of the handlebar 12, is preferably substantially continuous. The liner 18 also has flanges 58A and 58B on opposite sides for contacting outer surfaces of the body 16 on either side of the concave surface 52. The flanges 58A and 58B hold the liner 18 in place between the concave surface 52 of the body 16 and the adjacent portion of the outer surface of the handlebar 12. (See FIG. 1.)

The body 16 is preferably made from a substantially rigid material such as a metal or hard plastic. Suitable metals include aluminum and stainless steel. The low-friction liner 18 is preferably made from a plastic having a low coefficient of friction. Suitable plastic materials include nylon and polyethylene.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A lever assembly adapted to be mounted on a handlebar, the lever assembly comprising:
   a base comprising a master cylinder or a cable actuating mechanism;
   a lever pivotally connected to the base for actuating the master cylinder or the cable actuating mechanism;
   a clamp member comprising:
      a substantially rigid body having a concave surface and two opposed ends;
      pair of bolts adapted to be passed through holes in the opposed ends of the body and fastened to the base to clamp the body and the base against the handlebar;
   a liner having a lower coefficient of friction than the body and installed over the concave surface of the body, between the body and the handlebar but not between the base and the handlebar, the liner having opposed first and second surfaces, wherein the first surface contacts the concave surface and the second surface contacts the handlebar for enabling rotation of the base when there is an impact upon the lever.

2. The lever assembly as recited in claim 1, wherein the first surface of the liner is adapted for substantially continuous contact with the concave surface of the body, and wherein the second surface of the liner is adapted for substantially continuous contact with an adjacent portion of the outer surface of the handlebar.

3. The lever assembly as recited in claim 1, wherein the liner of the clamp member is made from a plastic material.

4. The lever assembly as recited in claim 1, wherein the body of the clamp member comprises outer surfaces on either side of the concave surface, and wherein the liner of the clamp member comprises a pair of flanges positioned on opposite sides for contacting the outer surfaces of the body.

* * * * *